United States Patent
Huang et al.

(10) Patent No.: US 10,254,965 B2
(45) Date of Patent: Apr. 9, 2019

(54) METHOD AND APPARATUS FOR SCHEDULING BLOCK DEVICE INPUT/OUTPUT REQUESTS

(71) Applicant: STREAMAX TECHNOLOGY CO., LTD., Shenzhen, Guangdong (CN)

(72) Inventors: Kaiming Huang, Guangdong (CN); Wentao Liu, Guangdong (CN); Jianzhang Gui, Guangdong (CN)

(73) Assignee: STREAMAX TECHNOLOGY CO., LTD., Shenzhen (CN)

( * ) Notice: Subject to any disclaimer, the term of this patent is extended or adjusted under 35 U.S.C. 154(b) by 68 days.

(21) Appl. No.: 15/323,966

(22) PCT Filed: Dec. 1, 2014

(86) PCT No.: PCT/CN2014/092691
§ 371 (c)(1),
(2) Date: Jan. 4, 2017

(87) PCT Pub. No.: WO2016/058247
PCT Pub. Date: Apr. 21, 2016

(65) Prior Publication Data
US 2017/0206008 A1    Jul. 20, 2017

(30) Foreign Application Priority Data
Oct. 14, 2014    (CN) .......................... 2014 1 0541441

(51) Int. Cl.
*G06F 3/06*    (2006.01)
*G06F 9/48*    (2006.01)

(52) U.S. Cl.
CPC ............... *G06F 3/061* (2013.01); *G06F 3/06* (2013.01); *G06F 3/0616* (2013.01);
(Continued)

(58) Field of Classification Search
USPC ........................................................ 711/103
See application file for complete search history.

(56) References Cited

U.S. PATENT DOCUMENTS

| | | | | |
|---|---|---|---|---|
| 5,687,390 A * | 11/1997 | McMillan, Jr. | ........ | G06F 3/0601 710/5 |
| 6,160,812 A * | 12/2000 | Bauman | ................ | H04L 47/566 370/230 |
| 6,986,009 B1 * | 1/2006 | Lecrone | .............. | G06F 11/2071 707/999.202 |
| 7,596,670 B2 * | 9/2009 | Zohar | ................. | G06F 12/0866 711/163 |
| 8,732,342 B1 * | 5/2014 | Clark | .................... | G06F 9/4881 370/229 |
| 9,026,819 B2 * | 5/2015 | Nguyen Tien | ........ | G06F 1/3203 713/320 |

(Continued)

FOREIGN PATENT DOCUMENTS

| | | |
|---|---|---|
| CN | 101639763 A | 2/2010 |
| CN | 102402401 A | 4/2012 |
| CN | 103823636 A | 5/2014 |

OTHER PUBLICATIONS

International Search Report dated May 18, 2015 for related PCT Application No. PCT/CN2014/092691.

*Primary Examiner* — Mano Padmanabhan
*Assistant Examiner* — Jean C Edouard
(74) *Attorney, Agent, or Firm* — Loza & Loza, LLP; Michael Fedrick

(57) ABSTRACT

The present invention provides a method and apparatus for scheduling block device input/output requests, which relates to the field of computer memories. The method comprises: generating a block device input/output request firstly, wherein the block device input/output request comprises a write operation request; then judging whether the generated block device input/output request can be combined with
(Continued)

block device input/output requests in a request queue; and if the generated block device input/output request cannot be combined with block device input/output requests in a request queue, sending the generated block device input/output request to a foremost position of the request queue when a destination device of the generated block device input/output request is a solid state disk or an SD card. By means of the method and apparatus for scheduling the block device input/output requests, the efficiency of write operation is improved.

10 Claims, 2 Drawing Sheets

(52) U.S. Cl.
CPC .......... *G06F 3/0655* (2013.01); *G06F 3/0659* (2013.01); *G06F 3/0679* (2013.01); *G06F 3/0688* (2013.01); *G06F 9/4881* (2013.01)

(56) References Cited

U.S. PATENT DOCUMENTS

| | | | |
|---|---|---|---|
| 9,104,317 B2* | 8/2015 | Hayakawa | G06F 3/0611 |
| 9,134,909 B2* | 9/2015 | Padia | G06F 3/061 |
| 2007/0198750 A1* | 8/2007 | Moilanen | G06F 9/5083 710/6 |
| 2010/0180086 A1* | 7/2010 | Allen | G06F 3/0617 711/147 |
| 2010/0318736 A1* | 12/2010 | Balsubramanian | G06F 11/3414 711/114 |
| 2011/0066770 A1* | 3/2011 | Muppirala | G06F 3/061 710/39 |
| 2014/0223071 A1 | 8/2014 | Bert et al. | |

* cited by examiner

METHOD AND APPARATUS FOR SCHEDULING BLOCK DEVICE INPUT/OUTPUT REQUESTS

TECHNICAL FIELD

The present invention relates to the field of computer memories, in particular to a method and apparatus for scheduling block device input/output requests.

BACKGROUND

Block device input/output scheduling algorithm for traditional operating systems (e.g., Linux and windows) is for optimizing input/output performance of a hard disk driver (HDD) so that a mechanical head moves towards one direction continuously to the greatest extent so as to reduce seeking and positioning time overhead of the mechanical head.

With the development of technology, solid state disks and SD cards (Secure Digital Memory Cards) both using flash particles begin to replace HDD having a mechanical head. The main difference from HDD lies in that flash particles do not need seeking and positioning overhead that the mechanical head requires. However, the interior of a flash memory needs to operate a garbage collection operation at the background and erase useless data chunks so as to make space for a following write operation.

In a test, it is found that there is a matching conflict happening between the block device scheduling algorithm of an operating system and the timely garbage recycle of a flash memory. The conflict goes as follows: continuously write an SD card, 64 KB every time, with random write addresses. After a period of time, tens of times of sequential wire operations happen, each with time consumption more than 3 seconds, and even the time consumption of several write operations is as long as tens of seconds. After 1-2 minutes, it reverts to short normal and then recurs again. In a highly real-time data collection application scenario, such write operation with long-lasting continuous overlong time consumption will cause data buffering block, resulting in a serious real-time data loss accident.

SUMMARY

The present invention provides a method and apparatus for scheduling input/output requests to improve the efficiency of write operation.

In one aspect, the present invention provides a method for scheduling block device input/output requests and the method comprises:

A. generating a block device input/output request firstly, wherein the block device input/output request comprises a write operation request;

B. judging whether the generated block device input/output request can be combined with block device input/output requests in a request queue, and then executing step C1 if the generated block device input/output request cannot be combined with block device input/output requests in a request queue; and C1. sending the generated block device input/output request to a foremost position of the request queue when a destination device of the generated block device input/output request is a solid state disk or an SD card.

In the second aspect, the present invention provides an apparatus for scheduling block device input/output requests and the apparatus comprises:

a generating module, used for generating a block device input/output request, wherein the block device input/output request comprises a write operation request;

a judging module, used for judging whether the generated block device input/output request can be combined with block device input/output requests in a request queue, and then starting the sending module if the generated block device input/output request cannot be combined with block device input/output requests in a request queue; and a sending module, used for sending the generated block device input/output request to a foremost position of the request queue when a destination device of the generated block device input/output request is a solid state disk or an SD card.

In the present invention, a block device input/output request is generated firstly, the block device input/output request comprises a write operation; then whether the generated block device input/output request can be combined with block device input/output requests in a request queue is judged; and if the generated block device input/output request cannot be combined with block device input/output requests in a request queue, the generated block device input/output request is sent to a foremost position of the request queue when a destination device of the generated block device input/output request is a solid state disk or an SD card; therefore, the efficiency of write operation is improved.

BRIEF DESCRIPTION OF THE DRAWINGS

In order to make the technical solutions disclosed in embodiments of the present invention more clear, drawings to be used for description of embodiments will be introduced briefly as follows. Obviously, drawings used in the following description are merely some embodiments of the present invention. Those skilled in the art also may conclude other drawings based on these drawings without paying creative labor.

DETAILED DESCRIPTION OF THE PREFERRED EMBODIMENTS

In order to make the object, technical solutions and advantages of the present invention more clear, the embodiments of the present invention will be described further in detail below with reference to the accompanying drawings.

Embodiment 1

Figure 1:
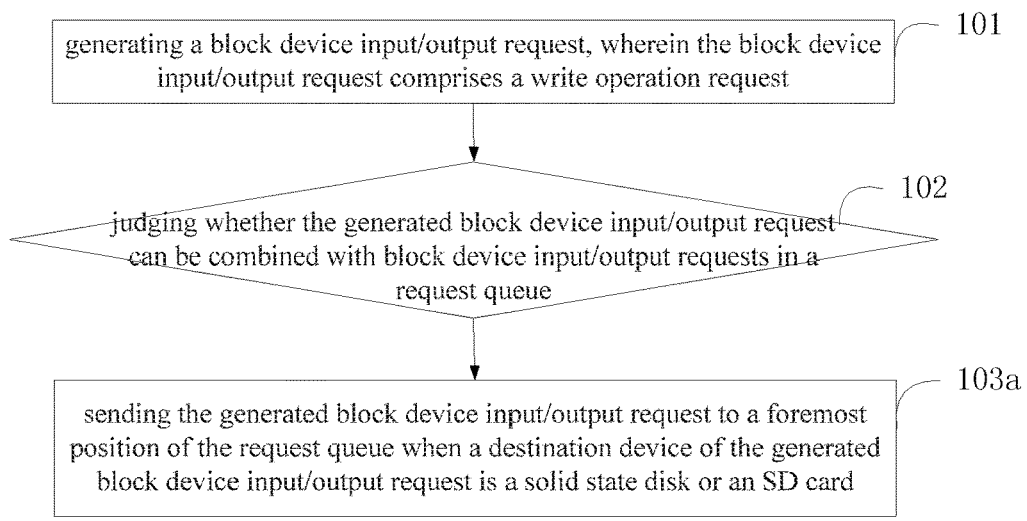
FIG. 1 shows a flow chart of a method for scheduling block device input/output requests, according to the Embodiment 1 of the present invention.

Embodiment 1 of the present invention provides a method for scheduling block device input/output requests. Referring to FIG. 1, the method for scheduling block device input/output requests comprises:

101. generating a block device input/output request, the block device input/output request comprises a write operation request;

102. judging whether the generated block device input/output request can be combined with block device input/output requests in a request queue, and then executing step 103a if the generated block device input/output request cannot be combined with block device input/output requests in a request queue;

Wherein the process of judging whether the generated block device input/output request can be combined with block device input/output requests in a request queue in step 102 is: judging whether a starting destination address of the generated block device input/output request is identical to ending destination addresses of block device input/output requests in a request queue, or judging whether and ending destination address of the generated block device input/output request is identical to starting destination addresses of block device input/output requests in a request queue.

103a. sending the generated block device input/output request to a foremost position of the request queue when a destination device of the generated block device input/output request is a solid state disk or an SD card.

Figure 2:
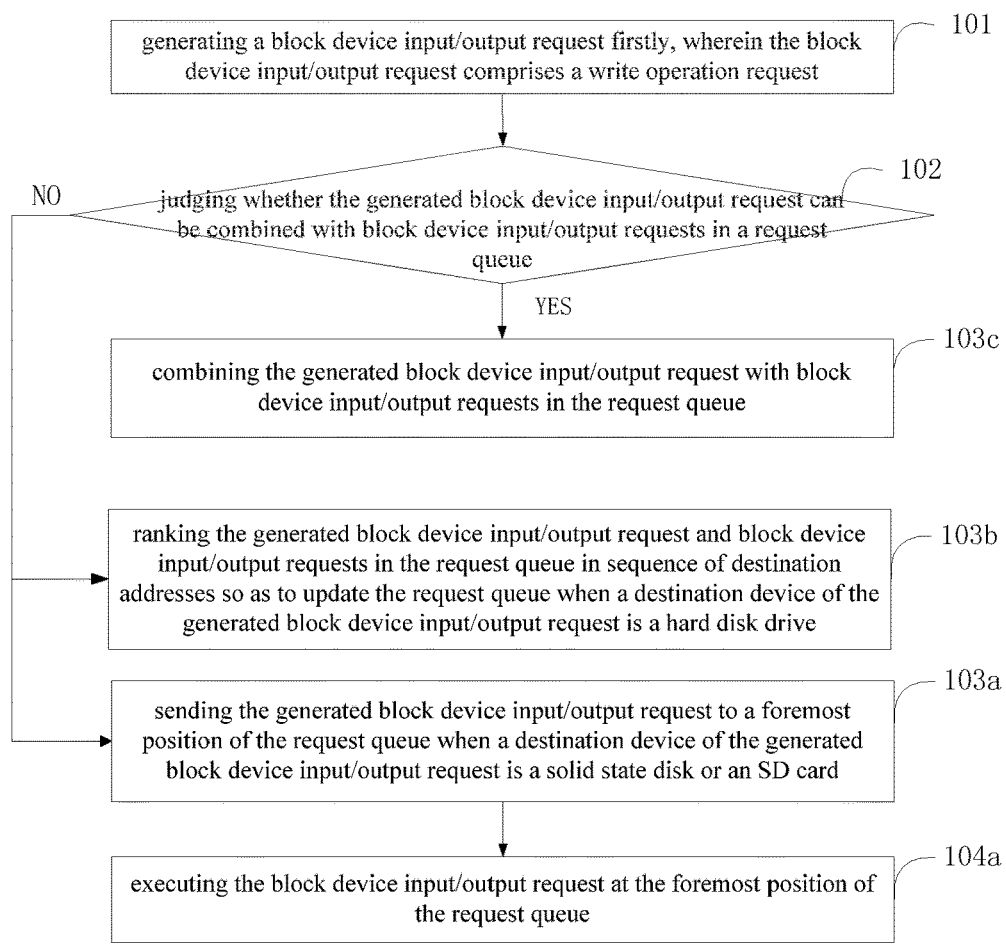
FIG. 2 shows another flow chart of the method for scheduling block device input/output requests, according to the Embodiment 1 of the present invention.

As shown in FIG. 2, if the judgment result at step 102 is negative, following step 102, the method further comprises step 103b.

103b. ranking the generated block device input/output request and block device input/output requests in the request queue in sequence of destination addresses so as to update the request queue when a destination device of the generated block device input/output request is a hard disk drive.

As shown in FIG. 2, if the judgment result at step 102 is affirmative, following step 102, the method further comprises step 103c.

103c. combining the generated block device input/output request with block device input/output requests in the request queue.

As shown in FIG. 2, following step 103a, the method further comprises step 104a.

104a. executing the block device input/output request at the foremost position of the request queue.

For example, a file system generates a write operation request with destination addresses of 00000-0045H and the destination addresses of a write operation request in a request queue are 00600-006 H 7, then a judgment that the generated write operation request cannot be combined with the write operation requests in the request queue is made. The generated write operation request is sent to a foremost position of the request queue when a destination device of the generated block device input/output request is a solid state disk, and then the write operation request at the foremost position of the request queue is executed.

For another example, a file system generates a write operation request with destination addresses of 00000-0045H, the destination addresses of a first write operation request in a request queue are 00600-006 H 7, and the destination addresses of a second write operation request in the request queue are 00700-008F4. When a destination device of the generated block device input/output request is a hard disk drive, the generated block device input/output request and block device input/output requests in the request queue in sequence of destination addresses are ranked so as to update the request queue, that is, the sequence of write operation requests in the updated request queue is: the newly generated write operation request, the first write operation request and the second write operation request.

For yet another example, a file system generates a write operation request with destination addresses of 00000-0045H, the destination addresses of a write operation request in a request queue are 0045H-001 H 7, i.e., the ending destination address of the generated write operation request is identical to the starting destination address of the write operation request in the request queue, and then the generated write operation request and the write operation requests in the request queue are combined into a new write operation request with destination addresses of 00000-001 H 7.

In the embodiment, a block device input/output request is generated firstly, wherein the block device input/output request comprises a write operation; then whether the generated block device input/output request can be combined with block device input/output requests in a request queue is judged; if the generated block device input/output request cannot be combined with block device input/output requests in a request queue, the generated block device input/output request is sent to a foremost position of the request queue when a destination device of the generated block device input/output request is a solid state disk or an SD card; therefore, the efficiency of write operation is improved.

Embodiment 2

Figure 3:
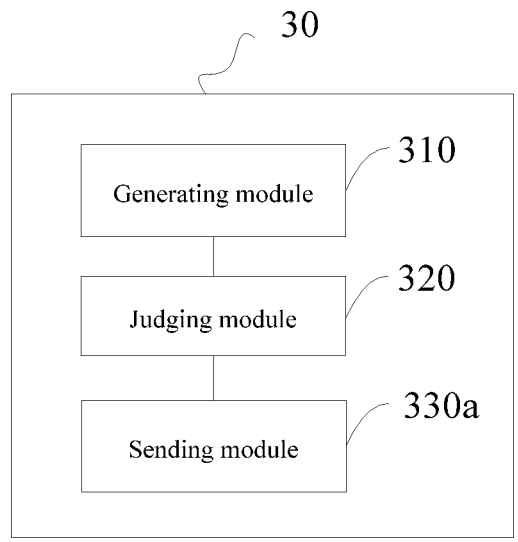
FIG. 3 shows a structure schematic diagram of an apparatus for scheduling block device input/output requests, according to the Embodiment 3 of the present invention.

Embodiment 2 of the present invention provides an apparatus for scheduling block device input/output requests. Referring to FIG. 3, the apparatus for scheduling block device input/output requests 30 comprises a generating module 310, a judging module 320 and a sending module 330a.

The generating module 310 is used for generating a block device input/output request, wherein the block device input/output request comprises a write operation request.

The judging module 320 is used for judging whether the generated block device input/output request can be combined with block device input/output requests in a request queue, and then starting the sending module if the generated block device input/output request cannot be combined with block device input/output requests in a request queue.

The sending module 330a is used for sending the generated block device input/output request to a foremost position of the request queue when a destination device of the generated block device input/output request is a solid state disk.

Figure 4:
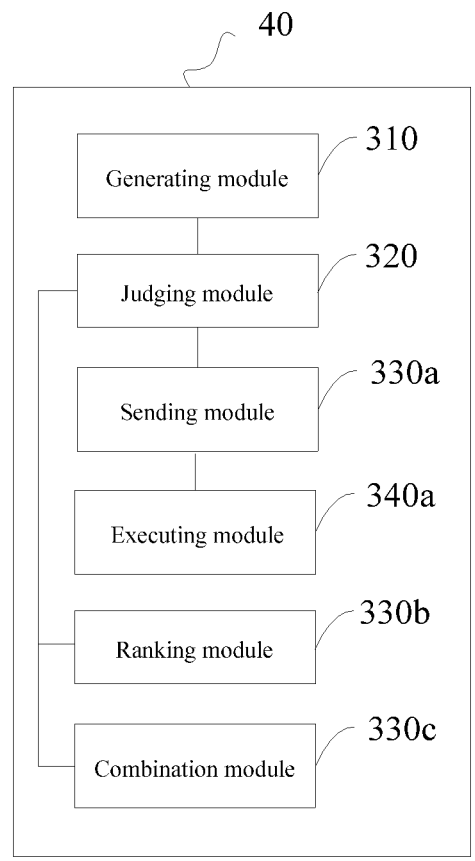
FIG. 4 shows a structure schematic diagram of a restoring module of the apparatus for scheduling block device input/output requests, according to the Embodiment 3 of the present invention.

Optionally, as shown in FIG. 4, the apparatus for scheduling block device input/output requests 30 further comprises a ranking module 330b, a combining module 330c and an executing module 340a.

The ranking module 330b is used for ranking the generated block device input/output request and block device input/output requests in the request queue in sequence of destination addresses so as to update the request queue when the destination device of the generated block device input/output request is a hard disk drive.

The combining module 330c is used for combining the generated block device input/output request with block device input/output requests in the request queue.

The executing module 340c is used for executing a block device input/output request at a foremost position of the request queue.

Wherein, the process that the judging module 320 judges whether the generated block device input/output request can be combined with block device input/output requests in a request queue is: judging whether a starting destination address of the generated block device input/output request is identical to ending destination addresses of block device input/output requests in a request queue, or judging whether and ending destination address of the generated block device input/output request is identical to starting destination addresses of block device input/output requests in a request queue.

In the embodiment, a block device input/output request is generated firstly, wherein the block device input/output request comprises a write operation; then whether the generated block device input/output request can be combined with block device input/output requests in a request queue is judged; if the generated block device input/output request cannot be combined with block device input/output requests in a request queue, the generated block device input/output request is sent to a foremost position of the request queue when a destination device of the generated block device input/output request is a solid state disk or an SD card; therefore, the efficiency of write operation is improved.

The serial numbers of the embodiments disclosed in the present invention are only for illustration, rather than representing of the sequence of merits.

Those of ordinary skill in the art should understand that all or part of steps of the above-mentioned embodiments may be completed through hardware and also may be completed by relevant hardware under instructions through programs, and the programs may be stored in one kind of computer readable storage medium. The above-mentioned storage medium may be a read-only memory, a magnetic disk or CD, etc.

The embodiments mentioned above are merely preferred embodiments of the present invention and not intended to limit the present invention. Any of modifications, equivalent substitutions and improvements, etc. made within the spirit and principle of the present invention shall be covered in the protection scope of the present invention.

What is claimed is:

1. A method for scheduling input/output requests for a block device coupled to a computer processor having an operating system, wherein the method comprises:
   A. generating, by the computer processor, a block device input/output request, wherein the block device input/output request comprises a write operation request;
   B. determining, by the computer processor, whether the generated block device input/output request can be combined with block device input/output requests in a request queue; and
   C1. responsive to a determination that the generated block device input/output request cannot be combined with block device input/output requests in the request queue, sending, by the computer processor, the generated block device input/output request to a foremost position of the request queue when a destination device of the generated block device input/output request is a solid state disk or an SD card.

2. The method according to claim 1, wherein responsive to a determination that the generated block device input/output request cannot be combined with block device input/output requests in the request queue, the method further comprises:
   C2. ranking, by the computer processor, the generated block device input/output request and block device input/output requests in the request queue in sequence of destination addresses and update the request queue when a destination device of the generated block device input/output request is a hard disk drive.

3. The method according to claim 1, wherein the determining step further comprises:
   determining whether a starting destination address of the generated block device input/output request is identical to ending destination addresses of block device input/output requests in a request queue, or whether an ending destination address of the generated block device input/output request is identical to starting destination addresses of block device input/output requests in a request queue.

4. The method according to claim 1, wherein responsive to a determination that the generated block device input/output request cannot be combined with block device input/output requests in the request queue, the method further comprises:
   C3. combining, by the computer processor, the generated block device input/output request with block device input/output requests in the request queue.

5. The method according to claim 4, wherein the method further comprises:
   executing, by the computer processor, a block device input/output request at a foremost position of the request queue.

6. An apparatus for scheduling block device input/output requests, wherein the apparatus comprises:
   a block device;
   one or more computer processors in communication with the block device; and
      a memory, coupled to the one or more computer processors, storing program instructions which, when executed by the one or more computer processors, cause the one or more computer processors to:
         generate, by a generating module, a block device input/output request, wherein the block device input/output request comprises a write operation request;
         determine, by a judging module, whether the generated block device input/output request can be combined with block device input/output requests in a request queue; and
         responsive to a determination that the generated block device input/output request cannot be combined with block device input/output requests in a request queue, sending, by a sending module, the generated block device input/output request to a foremost position of the request queue when a destination device of the generated block device input/output request is a solid state disk or an SD card.

7. The apparatus according to claim 6, wherein the memory further stores instructions that, when executed, cause the one or more computer processors to:
   rank, by a ranking module, the generated block device input/output request and block device input/output requests in the request queue in sequence of destination addresses and update the request queue when a destination device of the generated block device input/output request is a hard disk drive.

8. The apparatus according to claim 6, wherein determining, by the judging module, whether the generated block device input/output request can be combined with block device input/output requests in the request queue comprises:
   determining, by the judging module, one of whether a starting destination address of the generated block device input/output request is identical to ending destination addresses of block device input/output requests in a request queue, and whether an ending destination address of the generated block device input/output request is identical to starting destination addresses of block device input/output requests in a request queue.

9. The apparatus according to claim 6, wherein the memory further stores instructions that, when executed, cause the one or more computer processors to: combining, by a combining module, the generated block device input/output request with block device input/output requests in the request queue.

10. The apparatus according to claim 6, wherein the memory further stores instructions that, when executed, cause the one or more computer processors to: execute, by an executing module, a block device input/output request at a foremost position of the request queue.

* * * * *